(12) United States Patent
Götz et al.

(10) Patent No.: US 10,554,545 B2
(45) Date of Patent: Feb. 4, 2020

(54) DATA TRANSMISSION IN A COMMUNICATIONS NETWORK

(71) Applicant: SIEMENS AKTIENGESELLSCHAFT, München (DE)

(72) Inventors: Franz-Josef Götz, Heideck (DE); Dieter Klotz, Fürth (DE)

(73) Assignee: Siemens Aktiengesellschaft, München (DE)

( * ) Notice: Subject to any disclaimer, the term of this patent is extended or adjusted under 35 U.S.C. 154(b) by 125 days.

(21) Appl. No.: 15/553,867

(22) PCT Filed: Feb. 26, 2015

(86) PCT No.: PCT/EP2015/054048
§ 371 (c)(1),
(2) Date: Aug. 25, 2017

(87) PCT Pub. No.: WO2016/134774
PCT Pub. Date: Sep. 1, 2016

(65) Prior Publication Data
US 2018/0041432 A1 Feb. 8, 2018

(51) Int. Cl.
*H04L 12/28* (2006.01)
*H04L 12/721* (2013.01)
(Continued)

(52) U.S. Cl.
CPC .......... *H04L 45/66* (2013.01); *H04L 12/2859* (2013.01); *H04L 45/74* (2013.01);
(Continued)

(58) Field of Classification Search
CPC ........... H04L 47/2466; H04L 12/40163; H04L 47/6275; H04L 12/2859; H04N 1/00915;
(Continued)

(56) References Cited

U.S. PATENT DOCUMENTS

| 7,480,293 B2 | 1/2009 | Betker | |
|---|---|---|---|
| 2002/0087716 A1* | 7/2002 | Mustafa | ................. H04L 29/06 709/236 |

(Continued)

FOREIGN PATENT DOCUMENTS

| CN | 102725988 A | 10/2012 |
|---|---|---|
| CN | 103095607 A | 5/2013 |

(Continued)

OTHER PUBLICATIONS

English International Search Report issued by the European Patent Office in International Application PCT/EP2015/054048.

*Primary Examiner* — Salvador E Rivas
(74) *Attorney, Agent, or Firm* — Henry M. Feiereisen LLC

(57) ABSTRACT

In a method for data transmission in a communications network, data frames containing metadata and payloads are transmitted via point-to-point connections between a respective transmitter and a receiver according to a communications protocol. For each point-to-point connection, a transmission list of the data frames to be transmitted from the transmitter to the receiver is kept. In addition, a priority set of at least three interrupt priorities of pairs with differing significance is provided, and the communications protocol permits each data frame of a transmission list to be assigned an interrupt priority and to interrupt a current transmission of a data frame of the transmission list in order to transfer a data frame that is contained in the transmission list and that has been assigned a higher interrupt priority than the currently transferred data frame.

12 Claims, 7 Drawing Sheets

(51) Int. Cl.
*H04W 72/12* (2009.01)
*H04L 12/741* (2013.01)
*H04L 12/865* (2013.01)
*H04J 14/02* (2006.01)

(52) U.S. Cl.
CPC ..... *H04W 72/1242* (2013.01); *H04J 14/0279* (2013.01); *H04L 47/6275* (2013.01)

(58) Field of Classification Search
CPC ................ H04B 10/25755; H04J 3/085; H04J 14/0279; H04W 72/1242
See application file for complete search history.

(56) References Cited

U.S. PATENT DOCUMENTS

2014/0317322 A1* 10/2014 Rohatschek .......... H04L 12/423
710/110
2016/0197820 A1 7/2016 Goetz

FOREIGN PATENT DOCUMENTS

| | | |
|---|---|---|
| CN | 103248897 A | 8/2013 |
| CN | 104035901 A | 9/2014 |
| EP | 1 137 225 A1 | 9/2001 |
| EP | 2 538 619 A1 | 12/2012 |
| GB | 2 371 439 A | 7/2002 |

\* cited by examiner

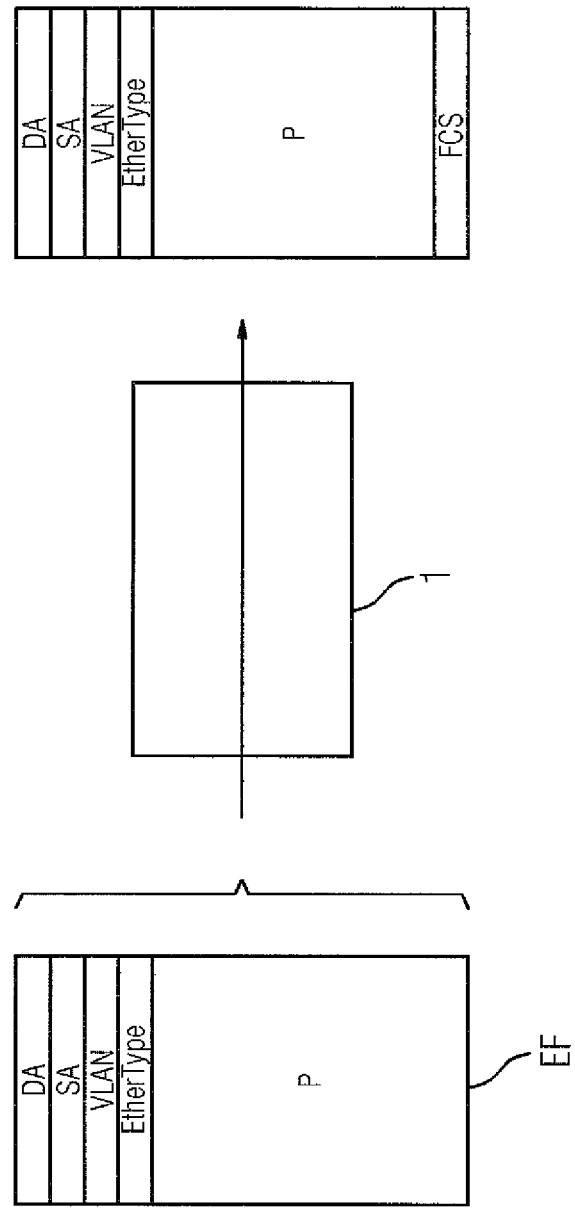

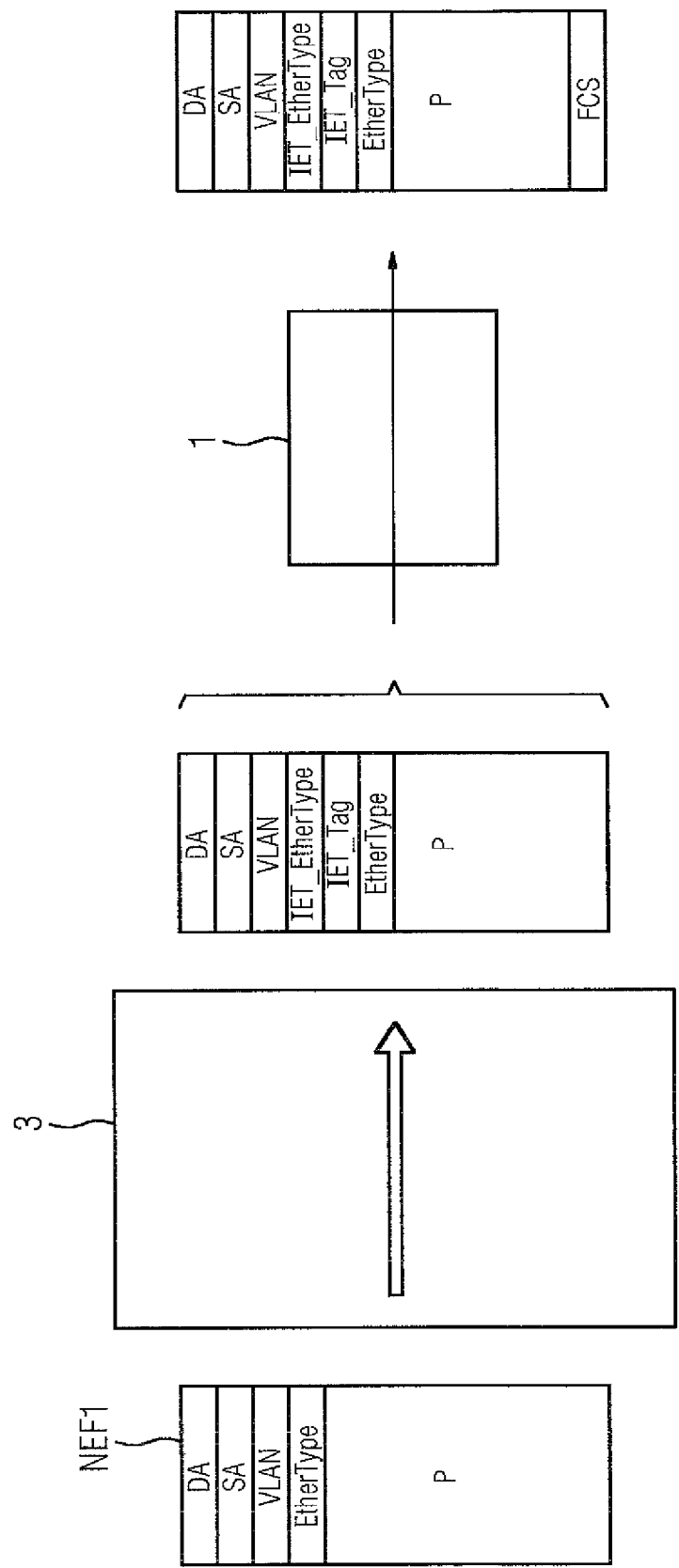

DATA TRANSMISSION IN A COMMUNICATIONS NETWORK

CROSS-REFERENCES TO RELATED APPLICATIONS

This application is the U.S. National Stage of International Application No. PCT/EP2015/054048, filed Feb. 26, 2015, which designated the United States and has been published as International Publication No. WO 2016/134774.

BACKGROUND OF THE INVENTION

The invention relates to a method for data transmission in a communication network, wherein data frames including metadata and useful data are transmitted via point-to-point connections between a respective transmitter and a receiver according to a communication protocol.

In this case, metadata refer to all data that a data frame includes other than the useful data. Metadata include control and protocol information for the transmission and processing of the data frame, for example addresses of the transmitter and receiver, the type and/or the length of a data frame. Frequently, metadata of a data frame precede the useful data and form the header of the data frame.

At the present time, more and more industrial sectors, particularly the automation and automotive industry and the energy sector, are demanding communication networks that are suitable for all communication services from the field bus level to the management level on the basis of a single standardized protocol. In the industrial sector, communication on the basis of the Ethernet protocol has gained ever more acceptance since the year 2000. Currently, working groups are working on extending Ethernet standards IEEE802.1 and IEEE802.3 (IEEE=Institute of Electrical and Electronics Engineers), which are suitable for communication services in a single convergent "time-sensitive network" (TSN) and allow what is known as quality of service (QoS). Despite this coexistence of different services having different priority in a communication network, it is necessary for minimal transmission times (low latency) and minimal jitter (low jitter) to be guaranteed for high-priority services, e.g. for what is known as control data traffic (CD traffic), for each path between controller and device. The higher the priority of a service, the shorter the transmission time and the lower the jitter need to be in each network node. The influence of lower-priority services on the transmission time and jitter of higher-priority services needs to be minimized in this case. This extensive decoupling is a prerequisite for efficient coexistence of different services having different priority in a communication network.

Currently, what is known as the IEEE802.3br Interspersing Express Traffic (IET) working group is discussing designs for a future Ethernet standard that, in the area of responsibility of the IEEE802.3 standard in a convergent time-sensitive network, minimizes the influence of lower-priority services on the transmission time and jitter of higher-priority services. In particular, high-priority services are intended to be able to interrupt the sending of lower-priority services by means of preemption. To this end, two priority classes are defined. All data frames of the high-priority services are combined in a priority class of what are known as express frames. All other data frames are combined in a priority class of normal data frames (non-express frames). To send an express frame, it is possible for the transmission of a normal data frame to be interrupted.

SUMMARY OF THE INVENTION

The invention is based on the object of specifying an improved method for data transmission in a communication network that reduces the transmission time and jitter of the transmission of data frames of higher-priority services.

The object is achieved according to the invention by a method for data transmission in a communication network, including data frames including metadata and useful data being transmitted via point-to-point connections between a respective transmitter and a receiver according to a communication protocol, wherein a transmission list of data frames to be transmitted from the transmitter to the receiver is managed for each point-to-point connection. Further, a priority set of at least three interrupt priorities having significances differing in pairs is prescribed. The communication protocol allows each data frame on a transmission list to be allocated an interrupt priority, and a present transmission of a data frame on the transmission list to be interrupted in order to transmit a data frame that is included in the transmission list and that has a higher allocated interrupt priority than the presently transmitted data frame.

In this case, a first interrupt priority is referred to as higher than a second interrupt priority if it has a higher significance than the second interrupt priority. The significance defines a total order on the priority set.

A transmission list may be split into transmission list fragments that respectively have data frames having the same interrupt priority, for example.

The method according to the invention therefore allows the transmission of data frames to be interrupted on the basis of their interrupt priority. More precisely, the transmission of a data frame on a transmission list can be interrupted in favor of the transmission of any other data frame, incorporated in the same transmission list, that has a higher allocated interrupt priority than the presently transmitted data frame, at least three different interrupt priorities being provided. As a result, services having different interrupt priorities can be defined, so that a data frame is transmitted all the more preferably the higher the interrupt priority of the associated service. This particularly allows the mean transmission times and jitter of the data frames of services to be reduced all the more the higher the interrupt priority of the respective service. Since at least three different interrupt priorities are provided, the interrupt priorities can be matched very flexibly to the respective demands. As a result, the method according to the invention is particularly advantageously suitable for time-sensitive networking for services that require transmission of data frames with very low transmission latency and high availability.

One configuration of the invention provides for a transmitter and a receiver of a point-to-point connection to agree how many different interrupt priorities are made available for the transmission list of the point-to-point connection.

This configuration of the invention takes into consideration the possibility that the transmitter and the receiver of a point-to-point connection support different numbers of different interrupt priorities. For such a case, there is therefore provision for the transmitter and the receiver of a point-to-point connection to agree the number of usable interrupt priorities before the transmission of data frames. In particular, this configuration covers the possibility that a transmitter and a receiver agree that the transmission of data frames is never interrupted if the transmitter or the receiver does not support transmission interrupts.

A further configuration of the invention provides for the communication protocol to allow the useful data of a data frame that is included in a transmission list and that has an allocated interrupt priority that is lower than the highest interrupt priority included in the priority set to be split over data frame fragments before the transmission of the data frame, and for the data frame fragments of the data frame to be transmitted in succession. This configuration involves ascertaining whether the transmission of the data frame is to be interrupted by respectively checking, before the sending of a data frame fragment of the data frame, whether the transmission list includes a data frame that has a higher allocated interrupt priority than the data frame of this data frame fragment. In this case, each data frame fragment preferably has a frame length of at least 64 bytes.

This configuration advantageously allows relatively easily implementable realization of interruptions in the transmission of data frames by means of breakdown (fragmentation) of a data frame into data frame fragments, before the transmission of which a respective check is performed to determine whether a data frame having a higher interrupt priority is to be sent. Data frame fragments having a frame length of at least 64 bytes are advantageous and preferred particularly if the communication network is in the form of an Ethernet network, since Ethernet protocols usually provide for a frame length of at least 64 bytes.

A further configuration of the invention provides for the communication protocol to allow the transmission of a data frame on a transmission list to be interrupted if, during the transmission of the data frame, a data frame that has a higher allocated interrupt priority than the presently transmitted data frame is incorporated into the transmission list. Preferably, this involves a minimum residual number of bytes being prescribed, and the transmission of a data frame on a transmission list is interrupted only if an as yet untransmitted number of useful data bytes of the data frame exceeds the prescribed minimum residual number of bytes. Further, an interruption in the transmission of a data frame on a transmission list preferably prompts a data frame fragment that includes the as yet untransmitted useful data of the data frame to be formed and incorporated into the transmission list.

In this configuration of the invention, in contrast to the aforementioned configuration, data frames are broken down into data frame fragments not irrespective of further data frames to be sent by a transmitter, but rather only if there is actually a data frame that is to be sent by the transmitter and that has a higher allocated interrupt priority than the presently transmitted data frame. In comparison with the aforementioned configuration, this has the advantage that transmitted data frames are fragmented only as required, which means that the transmission time for data frames is reduced on average in comparison with the aforementioned configuration. However, this requires constant monitoring of the arrival of further data frames to be sent by the transmitter and the implementation of interruption of the transmission of a data frame as required. Limiting the interruption of a transmission of a data frame to the case in which an as yet untransmitted number of useful data bytes of the data frame exceeds a minimum residual number of bytes advantageously prevents unnecessary complexity for interrupting the transmission of an already almost completely transmitted data frame.

A further configuration of the invention provides for the metadata of each data frame that has an allocated interrupt priority that is lower than the highest interrupt priority included in the priority set to include the interrupt priority allocated to the data frame and a frame number that characterizes the data frame. If a data frame is split into data frame fragments, each data frame fragment of a data frame preferably includes metadata that include the interrupt priority allocated to the data frame, a frame number characterizing the data frame and a number of as yet unsent useful data bytes of the data frame.

These configurations of the invention firstly allow the interrupt priority of a data frame to be taken from the metadata of said data frame. Further, they allow data frames having non-maximum interrupt priority to be distinguished from one another by different frame numbers, and data frame fragments belonging to the same such data frame to be denoted by a common frame number, so that the receiver can compile them to form the data frame. The statement of the number of as yet unsent useful data bytes of the data frame in the metadata of a data frame fragment allows the receiver of the data frame fragments to identify whether or when it has received all of the data frame fragments of a data frame and hence this data frame completely.

A further configuration of the invention provides for a multicast address reserved for data frame fragments to be prescribed and for the metadata of each data frame fragment that follows a first data frame fragment to include this prescribed multicast address as a destination address.

This configuration of the invention allows the receiver to identify whether or not a received data frame fragment is the first data frame fragment of a fragmented data frame.

In the two aforementioned configurations of the invention, a receiver of a data frame split into data frame fragments preferably uses the metadata of the data frame fragments received by it to ascertain whether it has received all data frame fragments of a data frame by ascertaining the total number of the useful data bytes of all data frame fragments received by it whose metadata include the same frame number and comparing said total number with the total number of the useful data bytes of the data frame. Further, the receiver compiles the data frame fragments received by it whose metadata include the same frame number to form a data frame after said receiver has received all data frame fragments of a data frame.

This configuration advantageously allows the receiver to use the information included in the metadata of the data frame fragments in order to compile data frame fragments to form complete data frames.

Preferably, the method according to the invention is used in a communication network that is in the form of an Ethernet network.

This use of the method according to the invention is particularly preferred, since Ethernet networks are used particularly for applications with services that require transmission of data frames with very low transmission latency and high availability, for which the method according to the invention is particularly suitable.

BRIEF DESCRIPTION OF THE DRAWING

The properties, features and advantages of this invention that are described above and the way in which they are achieved will become clearer and more distinctly comprehensible in conjunction with the description below of exemplary embodiments that are explained in more detail in conjunction with the drawings, in which:

FIG. 1 shows a time profile for a transmission of five data frames,

FIG. 2 shows the structure and sending of an express frame,

FIG. 3 shows the structure and sending of a non-express frame that is not split into data frame fragments.

Mutually corresponding parts are provided with the same reference symbols in all figures.

DETAILED DESCRIPTION OF PREFERRED EMBODIMENTS

Figure 4:
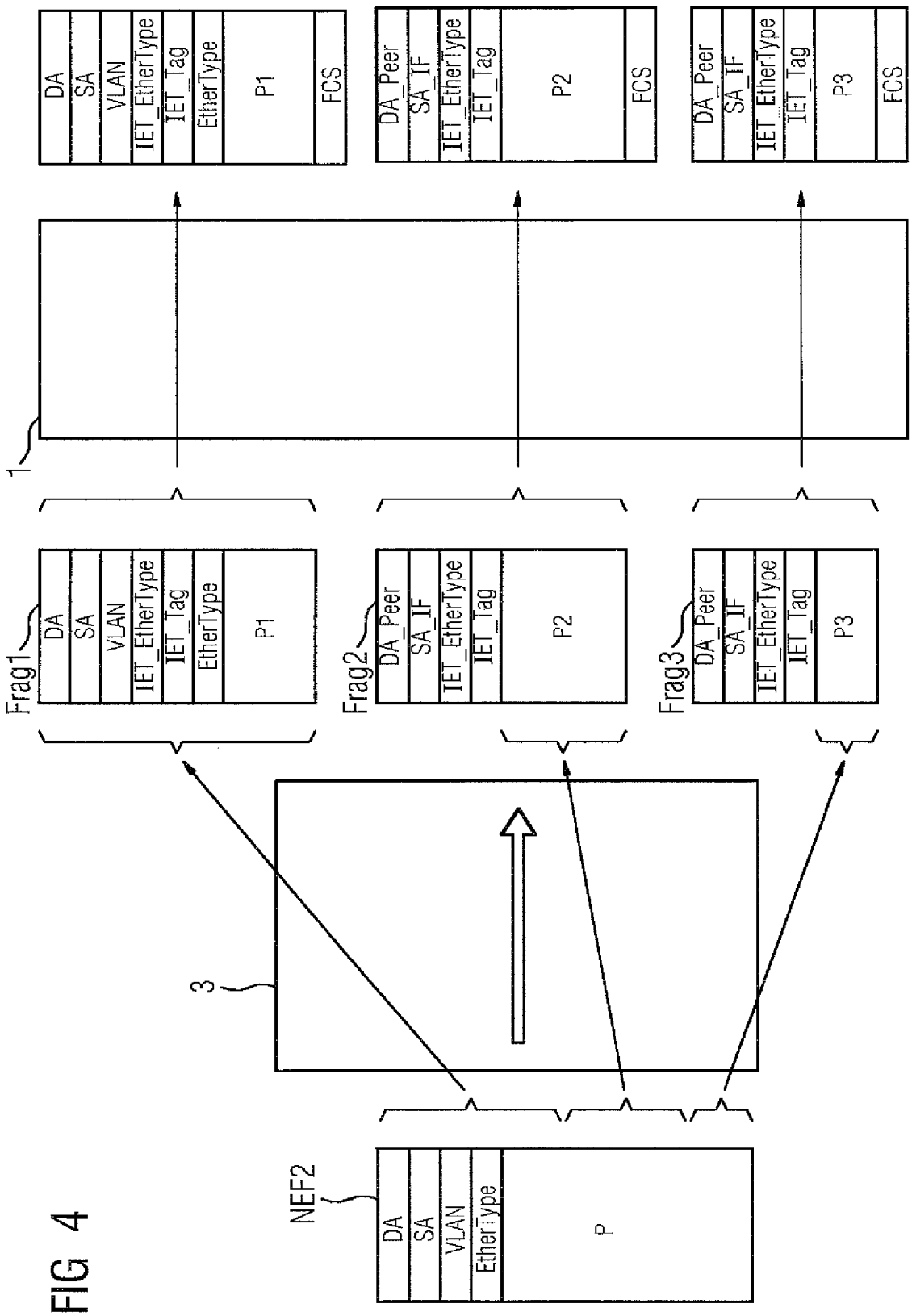
FIG. 4 shows the structure and sending of a non-express frame that is split into three data frame fragments.

FIG. 1 shows an example of a time profile for a transmission of five data frames respectively including metadata and useful data via a point-to-point connection from a transmitter to a receiver of a communication network according to a communication protocol. The communication network is in the form of an Ethernet network. Accordingly, the communication protocol is an Ethernet protocol and the data frames are Ethernet frames. Each data frame on a transmission list of the transmitter is allocated an interrupt priority of a prescribed priority set of at least three interrupt priorities having significances differing in pairs. Data frames that have the highest allocated interrupt priority included in the priority set are referred to as express frames. All other data frames are referred to as non-express frames.

The transmission of a non-express frame on the transmission list is interrupted according to the communication protocol if, during the transmission, a data frame is incorporated into the transmission list that has a higher allocated interrupt priority than the presently transmitted non-express frame, provided that an as yet untransmitted number of useful data bytes of the non-express frame exceeds a minimum residual number of bytes, which is prescribed as 44 bytes, for example.

To this end, a first interrupt variant provides for the useful data of each non-express frame that is included in a transmission list and that includes more useful data bytes than a prescribed minimum number of bytes, for example more than 88 bytes, to be split, before the transmission of the non-express frame, over data frame fragments that are transmitted in succession. Before the sending of a data frame fragment of the non-express frame, a respective check is performed to determine whether the transmission list includes a data frame that has a higher allocated interrupt priority than the non-express frame of this data frame fragment. Should the transmission list include such a data frame, the transmission of the data frame fragment is deferred and this data frame starts to be transmitted (in this regard see FIG. 8).

Alternatively, a second interrupt variant provides for the non-express frames on the transmission list to be split into data frame fragments not before they are actually transmitted but rather only if, during the transmission of a non-express frame, a data frame that has a higher allocated interrupt priority than the presently transmitted non-express frame is incorporated into the transmission list, provided that the as yet untransmitted number of useful data bytes of the non-express frame exceeds the minimum residual number of bytes. In this case, the transmission of the non-express frame is interrupted, a data frame fragment that includes the as yet untransmitted useful data of the non-express frame is formed and incorporated into the transmission list, and the transmission of the data frame having the higher interrupt priority is started.

By contrast, express frames are always transmitted without an interrupt.

In FIG. 1, EF_1 and EF_2 denote a first express frame and a second express frame, NEF2 Frag_1, NEF2 Frag_2 and NEF2 Frag_3 denote three different data frame fragments of a first non-express frame that has the third highest allocated interrupt priority included in the priority set, NEF1 Frag_1, NEF1 Frag_2 and NEF1 Frag_3 denote three different data frame fragments of a second non-express frame that has the second highest allocated interrupt priority included in the priority set, and NEF1 denotes a third non-express frame that likewise has the second highest allocated interrupt priority included in the priority set.

First of all, a first data frame fragment NEF2 Frag_1 of the first non-express frame is transmitted. The transmission of the first non-express frame is interrupted to transmit the second non-express frame. Therefore, a first data frame fragment NEF1 Frag_1 of the second non-express frame is subsequently transmitted. The transmission of the second non-express frame is subsequently interrupted to transmit the first express frame EF_1. After the transmission of the first express frame EF_1, the transmission of the second non-express frame that was interrupted thereby is continued by virtue of a second data frame fragment NEF1 Frag_2 of the second non-express frame being transmitted. The transmission of the second non-express frame is then interrupted again to transmit the second express frame EF_2. After the transmission of the second express frame EF_2, the transmission of the second non-express frame that was interrupted thereby is continued by virtue of the third and last data frame fragment NEF1 Frag_3 of the second non-express frame being transmitted. Subsequently, the interrupted transmission of the first non-express frame is continued by virtue of a second data frame fragment NEF2 Frag_2 of the first non-express frame being transmitted. The transmission of the first non-express frame is then interrupted again to transmit the third non-express frame NEF1. The third non-express frame NEF1 is not split into data frame fragments and transmitted without interruption, for example because, in the event of the use of the first interrupt variant, it does not include more useful data bytes than the prescribed minimum number of bytes or because, in the event of the use of the second interrupt variant, no express frame is incorporated into the transmission list during the transmission of the third non-express frame NEF1. After the transmission of the third non-express frame NEF1, the transmission of the first non-express frame is continued and is completed by the transmission of the third and last data frame fragment NEF2 Frag_3 of the first non-express frame.

The communication protocol differs from known Ethernet protocols in that it allows multi-level preemption of the transmission of data frames. This multi-level preemption is understood to mean the above-described interruption of the transmission of a non-express frame for the purpose of transmitting an express frame or a non-express frame that has a higher allocated interrupt priority than the presently transmitted non-express frame. In FIG. 1, it has been assumed that both the transmitter and the receiver of the point-to-point connection support this multi-level preemption. Whether and to what extent the transmitter and the receiver of a point-to-point connection support multi-level preemption is clarified between the transmitter and the receiver before the transmission of the data frames, for example by means of a negotiation protocol such as the link layer discover protocol (LLDP). Should this reveal that the transmitter or the receiver does not support multi-level preemption, data frames from the transmitter are transmitted to the receiver without multi-level preemption. In the event of both the transmitter and the receiver supporting multi-level preemption, the transmitter and the receiver, before the transmission of data frames, clarify particularly among one another how many different interrupt priorities are made available for the multi-level preemption and into how many data frame fragments a non-express frame is broken down at most for the multi-level preemption.

FIGS. 2 to 4 schematically show the structure and sending of data frames. In this case, FIG. 2 shows the structure and sending of an express frame EF, FIG. 3 shows the structure and sending of a non-express frame NEF1 that is not split into data frame fragments, and FIG. 4 shows the structure and sending of a non-express frame NEF2 that is split into three data frame fragments.

According to FIG. 2, an express frame EF has a header for metadata that precedes the useful data P included in the express frame EF. The metadata included in the header comprise a receiver address DA, which is an MAC address (=Media Access Control address) of the receiver, a transmitter address SA, which is an MAC address of the transmitter, an optional VLAN tag VLAN and an EtherType entry EtherType to denote the protocol needed for interpreting the useful data P. The express frame EF is augmented with a checksum FCS by a transmission module 1 at a transmission port of the transmitter, which is connected to a receiver port of the receiver, to identify transmission errors and is sent to the receiver port of the receiver. The checksum FCS is formed from the metadata and useful data P of the express frame EF in a known manner, for example as a CRC checksum (CRC=Cyclic Redundancy Check), and inserted after the useful data P as a trailer of the sent express frame EF.

FIG. 3 shows the structure and sending of a non-express frame NEF1 that is not split into data frame fragments and whose transmission is not interrupted. Like the express frame EF depicted in FIG. 2, the non-express frame NEF1 has a header for metadata that comprise a receiver address DA, a transmitter address SA, an optional VLAN tag VLAN and an EtherType entry EtherType. In order to distinguish a non-express frame NEF1 from an express frame EF and describe its multi-level preemption properties, its header has metadata added to it by a preemption module 3, said metadata comprising an EtherType supplementary entry IET_EtherType and a preemption tag IET_Tag. The EtherType supplementary entry IET_EtherType distinguishes the non-express frame NEF1 from an express frame EF. The preemption tag IET_Tag includes information relevant to the multi-level preemption, which information is described in more detail below with reference to FIG. 5. After the addition of the EtherType supplementary entry IET_EtherType and of the preemption tag IET_Tag, the non-express frame NEF1 is, like an express frame EF, augmented with a checksum FCS by a transmission module 1 at a transmission port of the transmitter, which is connected to a receiver port of the receiver, to identify transmission errors and is sent to the receiver port of the receiver.

FIG. 4 shows the structure and sending of a non-express frame NEF2 whose useful data P are split over three data frame fragments Frag1, Frag2, Frag3 before the transmission of said non-express frame from the transmitter to the receiver according to the first interrupt variant described above. Like the express frame EF depicted in FIG. 2, the non-express frame NEF2 has a header for metadata that comprise a receiver address DA, a transmitter address SA, an optional VLAN tag VLAN and an EtherType entry EtherType. A preemption module 3 forms three data frame fragments Frag1, Frag2, Frag3 from the express frame NEF2. A first data frame fragment Frag1 includes a first useful data component P1 of the useful data P of the non-express frame NEF2 and has a header that, like the header of the non-express frame NEF1 depicted in FIG. 3, comprises as metadata the receiver address DA, the transmitter address SA, the optional VLAN tag VLAN and the EtherType entry EtherType and also an EtherType supplementary entry IET_EtherType and a preemption tag IET_Tag. The two further data frame fragments Frag2, Frag3 respectively include a further useful data component P2, P3 of the useful data P of the express frame NEF2 and respectively have a header that includes as metadata a multicast address DA Peer reserved for data frame fragments, an MAC port address SA_IF specific to the respective transmission port of the transmitter and also an EtherType supplementary entry IET_EtherType and a preemption tag IET_Tag. A transmission module 1 at the transmission port augments each data frame fragment Frag1, Frag2, Frag3 formed by the preemption module 3 with a checksum FCS to identify transmission errors and sends said data frame fragments to a receiver port of the receiver.

Figure 5:
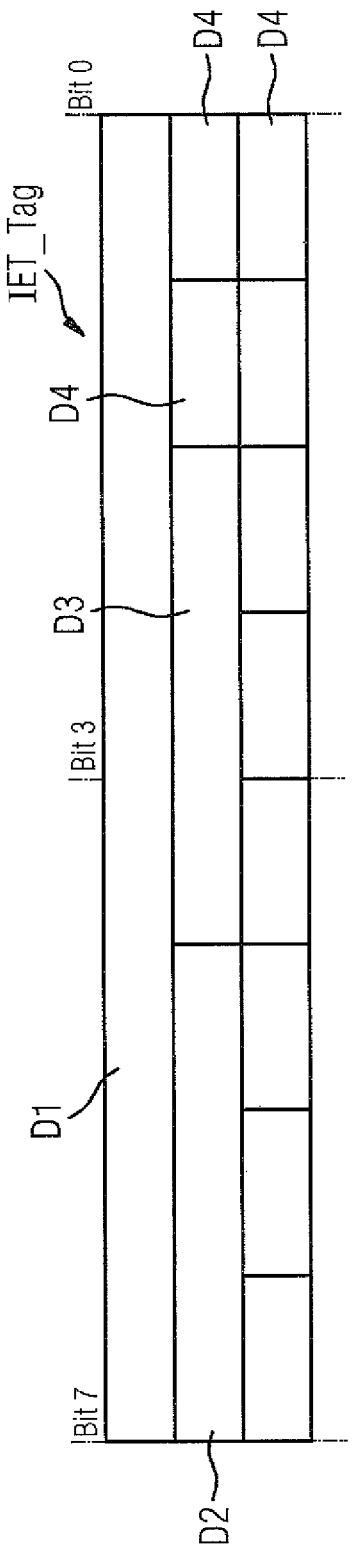
FIG. 5 shows data fields of a preemption tag of a non-express frame.

FIG. 5 shows, by way of example, data fields of a preemption tag IET_Tag of a non-express frame NEF1, NEF2 that are split over three bytes, each byte of the preemption tag IET_Tag being depicted in one row in FIG. 5.

A first data field D1 that comprises eight bits and a second data field D2 that comprises three bits include a number of as yet unsent useful data bytes of the non-express frame NEF1, NEF2. The total number eleven of the bits of these data fields D1, D2 in this exemplary embodiment matches the maximum number 1500 of useful data bytes that are usually provided for an Ethernet frame. On the basis of the number of as yet unsent useful data bytes that is included in the data fields D1, D2 and the number of already received useful data bytes of a non-express frame NEF1, NEF2, the receiver can identify whether it has already received all useful data P of the non-express frame NEF1, NEF2.

A third data field D3 that comprises three bits includes a frame number that is allocated to the non-express frame NEF1, NEF2 and on the basis of which different non-express frames NEF1, NEF2 on the same transmission list are distinguished. The preemption tag IET-Tag depicted in FIG. 5 can thus assign eight different frame numbers, and hence eight non-express frames NEF1, NEF2 can be distinguished from one another. If a non-express frame NEF1, NEF2 is split into multiple data frame fragments Frag1, Frag2, Frag3 (see FIG. 4), all these data frame fragments Frag1, Frag2, Frag3 are provided with the same frame number, which means that the receiver can identify data frame fragments Frag1, Frag2, Frag3 belonging to the same non-express frame NEF1, NEF2.

Further fourth data fields D4 that respectively comprise one bit include the interrupt priority allocated to the non-express frame NEF1, NEF2. In this case, the number of fourth data fields D4 needed therefor is dependent on the number of interrupt priorities included in the priority set. FIG. 5 depicts ten fourth data fields D4. If the priority set includes only three different interrupt priorities, for example, however, then denoting the interrupt priority of a non-express frame NEF1, NEF2 requires only one fourth data field D4, since the priority set includes only two different interrupt priorities that can be allocated to a non-express frame NEF1, NEF2 (since the highest interrupt priority is reserved for express frames E4 in each case, of course). If, by contrast, the priority set includes five different interrupt priorities, for example, then denoting the interrupt priority of a non-express frame NEF1, NEF2 requires two fourth data fields D4. A similar situation applies to higher numbers in the priority set of included interrupt priorities.

Figure 6:
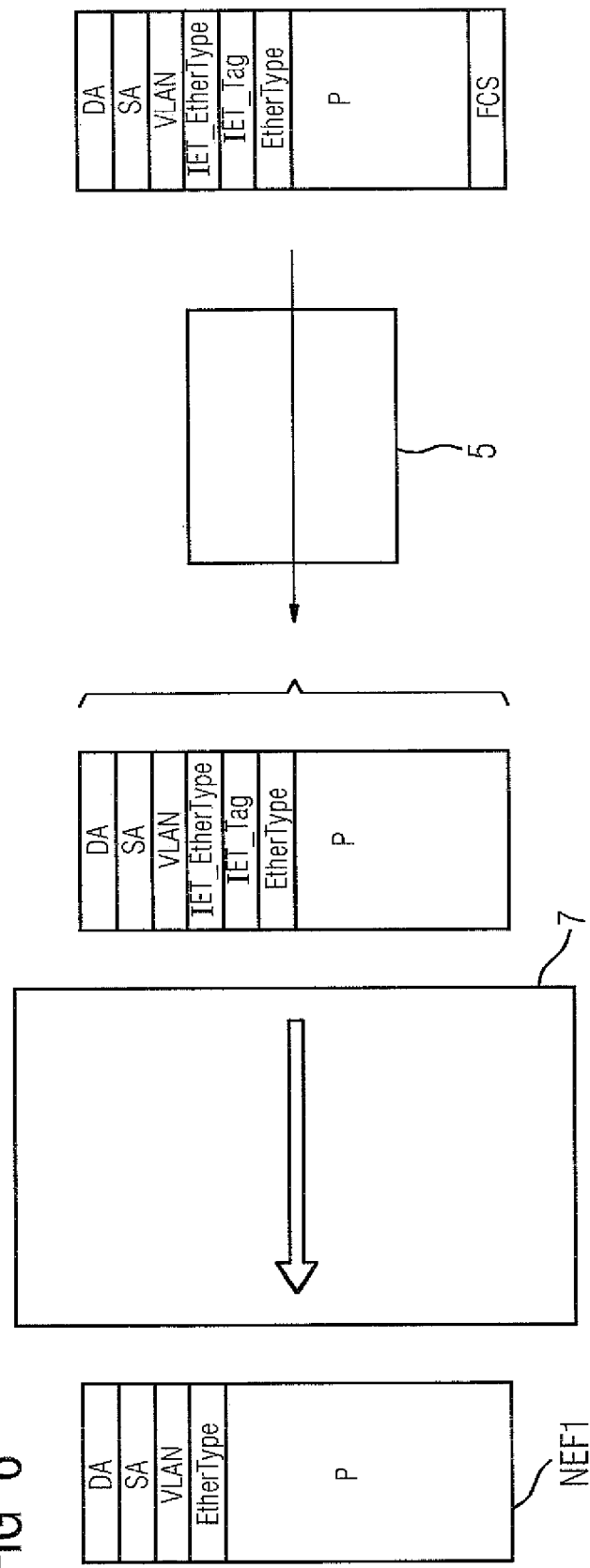
FIG. 6 shows the reception of a non-express frame sent without interruption that has not been split into data frame fragments.
Figure 7:
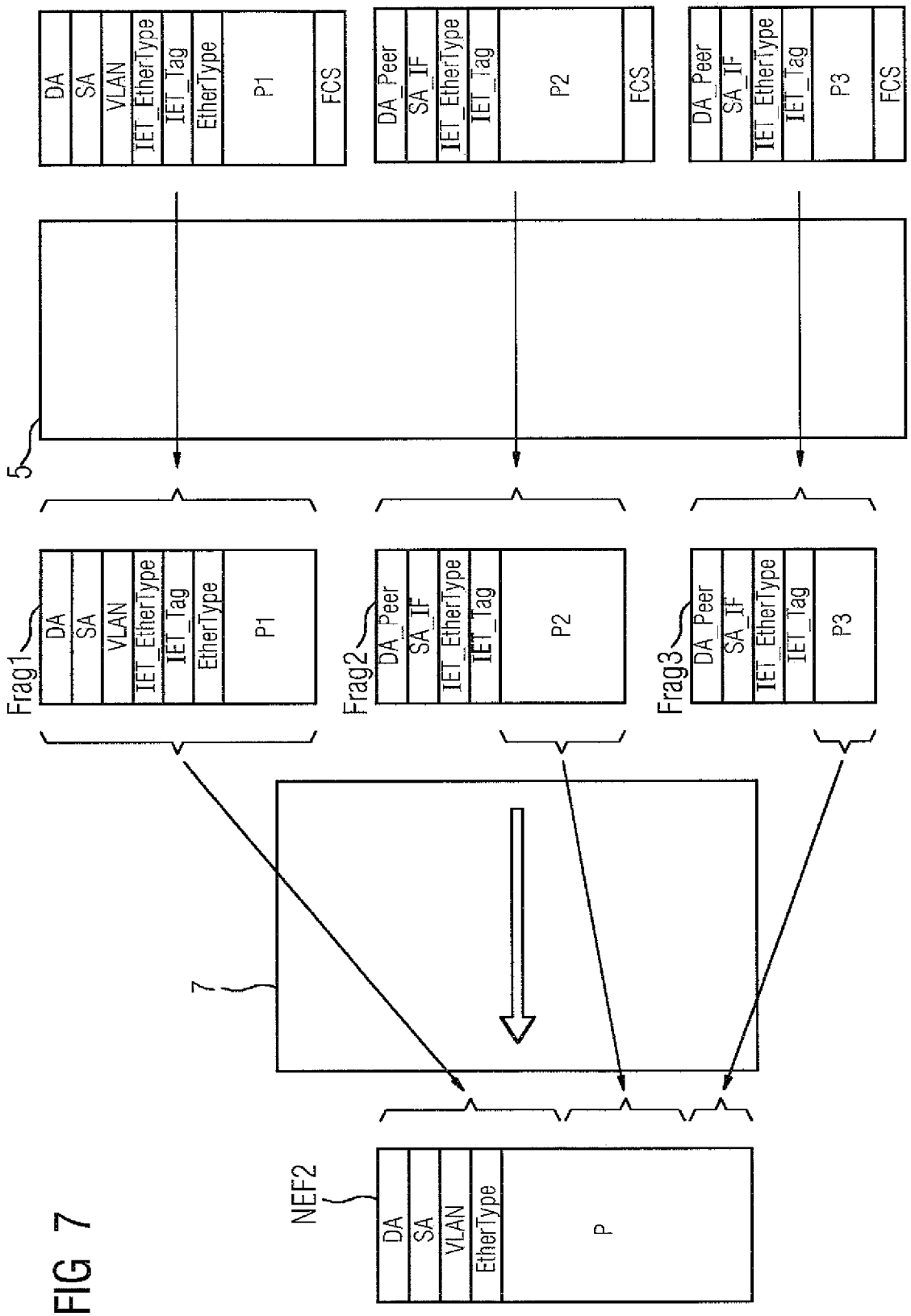
FIG. 7 shows the reception of a non-express frame that has been split into three data frame fragments.

FIGS. 6 and 7 respectively show the reception of a non-express frame NEF1, NEF2 at a receiver port of a receiver of the non-express frame NEF1, NEF2.

FIG. 6 shows the reception of a non-express frame NEF1 that has been sent without interruption according to FIG. 3 and that has not been split into data frame fragments. The non-express frame NEF1 is received by a receiver module 5 at the reception port. The receiver module 5 uses the checksum FCS to check whether the non-express frame NEF1 has been received correctly. If the result of this check turns out to be positive, the receiver module 5 removes the checksum FCS and transfers the non-express frame NEF1 to a defragmentation module 7. The defragmentation module 7 uses the metadata in the header of non-express frame NEF1 to identify that the non-express frame NEF1 is not split into data frame fragments and has been received completely, and removes the EtherType supplementary entry IET_EtherType and the preemption tag IET_Tag from the header.

FIG. 7 shows the reception of a non-express frame NEF2 that has been sent according to FIG. 4 and that has been split into three data frame fragments Frag1, Frag2, Frag3. The three data frame fragments Frag1, Frag2, Frag3, which respectively include a checksum FCS, are received by a receiver module 5 at the reception port in succession. The receiver module 5 checks for each data frame fragment Frag1, Frag2, Frag3, using the checksum FCS thereof, whether the data frame fragment Frag1, Frag2, Frag3 has been received correctly. If the result of this check turns out to be positive, the receiver module 5 removes the respective checksum FCS and transfers the respective data frame fragment Frag1, Frag2, Frag3 to a defragmentation module 7. The defragmentation module 7 uses the metadata in the headers of the data frame fragments Frag1, Frag2, Frag3 to identify that the non-express frame NEF2 is split into data frame fragments Frag1, Frag2, Frag3 and when all three data frame fragments Frag1, Frag2, Frag3 have been received completely. After all three data frame fragments Frag1, Frag2, Frag3 have been received completely, the defragmentation module 7 recompiles the data frame fragments Frag1, Frag2, Frag3 to form the original non-express frame NEF2, removing the EtherType supplementary entry IET_EtherType and the preemption tag IET_Tag from the header.

According to FIGS. 2 to 4, 6 and 7, the transmission modules 1 merely add a respective checksum FCS to data frames they send and the receiver modules 5 respectively remove merely the checksum FCS from the data frames they receive, the addition and removal of a checksum FCS respectively being performed in the same manner for an express frame, a non-express frame that has not been split into data frame fragments and a data frame fragment of a non-express frame. Therefore, the processing of express frames, non-express frames and data frame fragments does not require any special or additional transmission modules 1 or receiver modules 5 in comparison with the use of a conventional Ethernet protocol without multi-level preemption.

The EtherType supplementary entry IET_EtherType and the preemption tag IET_Tag are used merely to realize the transmission interrupts with multi-level preemption and are removed again after the reception of non-express frames, so that these frames, after their reception, can be processed in their original form by higher layers of the OSI model (=Open Systems Interconnection model).

Figure 8:
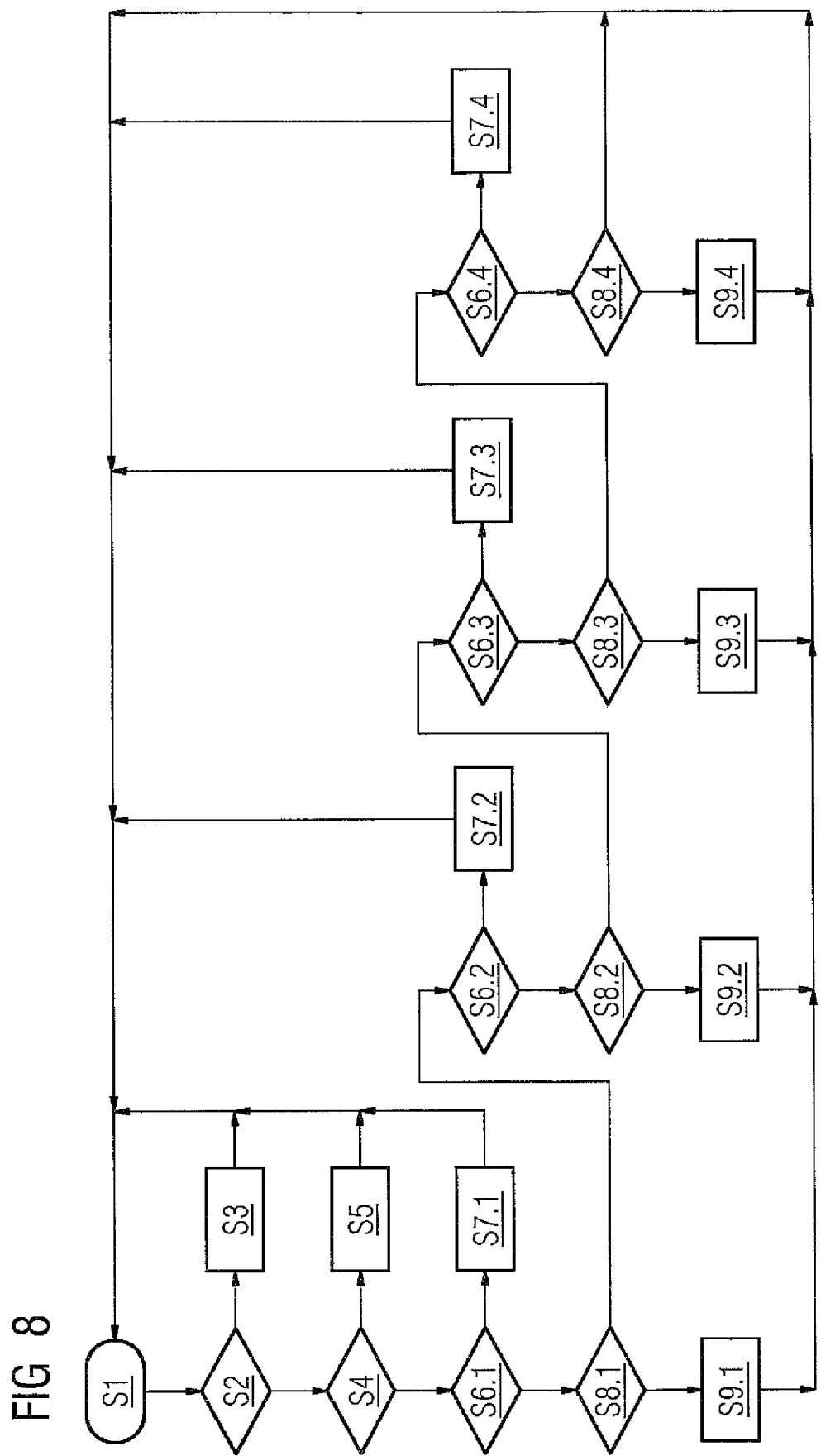
FIG. 8 shows a flowchart for a first interrupt variant.

FIG. 8 shows a flowchart for the first interrupt variant already mentioned above for a transmission list for the case in which the priority set includes five different interrupt priorities. Subsequently, the highest of these interrupt priorities is referred to as interrupt priority 0, the second highest is referred to as interrupt priority 1, the third highest is referred to as interrupt priority 2, the fourth highest is referred to as interrupt priority 3 and the fifth highest is referred to as interrupt priority 4. Each express frame is thus allocated the interrupt priority 0, while each non-express frame is allocated one of the interrupt priorities 1 to 4. The flowchart depicted in FIG. 8 includes method steps S1 to S9.4, which are described below.

S1: A data frame that is subsequently referred to as the "data frame under consideration" and has a highest interrupt priority among all data frames presently included in the transmission list and not processed is taken from the transmission list.

S2: A check is performed to determine whether the data frame under consideration is a non-express frame, for example by checking whether it has an EtherType supplementary entry IET_EtherType. If this is not the case, the data frame under consideration is an express frame and S3 is carried out; otherwise, the data frame under consideration is a non-express frame and S4 is carried out.

S3: The data frame under consideration, which in this case is an express frame, is sent (see FIG. 2 and the description thereof). Subsequently, S1 is carried out again.

S4: A check is performed, for example by means of an LLDP, to determine whether both the transmitter and the receiver support multi-level preemption. If this is not the case, S5 is carried out; otherwise, S6.1 is carried out.

S5: The data frame under consideration, which in this case is a non-express frame, is sent without interruption (see FIG. 3 and the description thereof). Subsequently, S1 is carried out again.

S6.X for X=1, 2, 3, 4: A check is performed to determine whether the transmission list includes a data frame fragment Frag2, Frag3 yet to be sent having the interrupt priority X. If this is the case, S7.X is carried out; otherwise, S8.X is carried out.

S7.X for X=1, 2, 3, 4: The data frame fragment Frag2, Frag3 yet to be sent ascertained in S6.X, having the interrupt priority X, is sent. Subsequently, S1 is carried out.

S8.X for X=1, 2, 3, 4: A check is performed to determine whether the transmission list includes a non-express frame having the interrupt priority X. If this is not the case, then the method step S6.X+1 is carried out in the cases X=1, 2, 3 and method step S1 is carried out in the case X=4; otherwise, S9.X is carried out.

S9.X for X=1, 2, 3, 4: A non-express frame ascertained in S8.X, having the interrupt priority X, is split into data frame fragments Frag1, Frag2, Frag3 as described above if need be, i.e. if this non-express frame contains more useful data bytes than the prescribed minimum number of bytes. If the non-express frame is split into data frame fragments Frag1 Frag2, Frag3, the first data frame fragment Frag1 is sent (see FIG. 4 and the description thereof) and the further data frame fragments Frag2, Frag3 are incorporated into the transmission list. Otherwise, i.e. if the non-express frame is not split into data frame fragments, the non-express frame is sent without interruption (see FIG. 3 and the description thereof). Subsequently, S1 is carried out.

Figure 9:
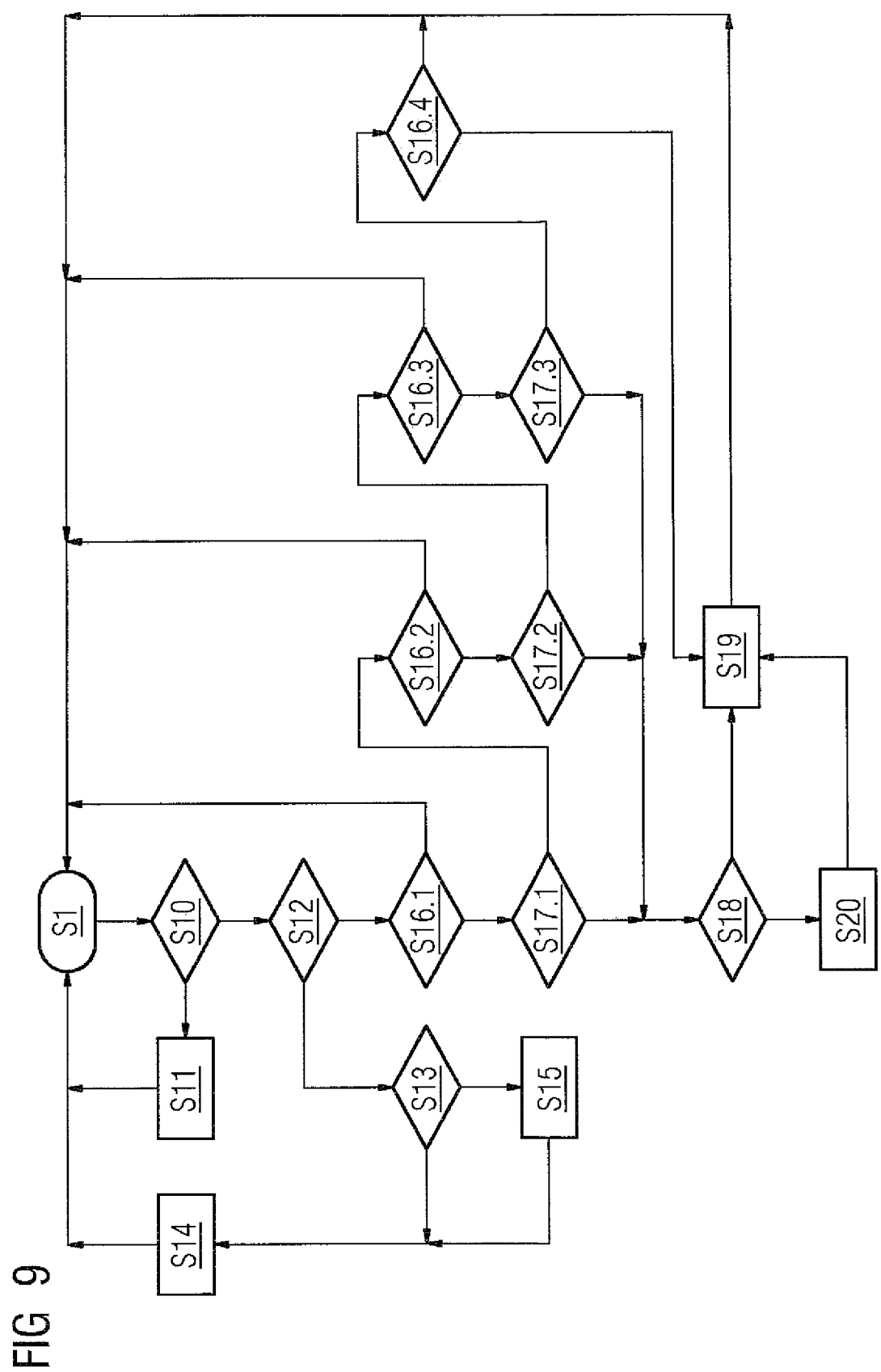
FIG. 9 shows a flowchart for a second interrupt variant.

FIG. 9 shows a flowchart for the second interrupt variant already mentioned above for a transmission list for the case in which the priority set includes five different interrupt priorities. As in the description of FIG. 8, the highest of these interrupt priorities is referred to as interrupt priority 0, the second highest is referred to as interrupt priority 1, the third highest is referred to as interrupt priority 2, the fourth highest is referred to as interrupt priority 3, and the fifth highest is referred to as interrupt priority 4. Each express frame is thus allocated the interrupt priority 0, while each non-express frame is allocated one of the interrupt priorities 1 to 4. The flowchart depicted in FIG. 9 includes method steps S1 and S10 to S20, which are described below.

S1: A data frame that is subsequently referred to as the "data frame under consideration" and has a highest interrupt priority among all data frames presently included in the transmission list and not processed is taken from the transmission list.

S10: A check is performed, for example by means of an LLDP, to determine whether both the transmitter and the receiver support multi-level preemption. If this is not the case, S11 is carried out; otherwise, S12 is carried out.

S11: The data frame under consideration is sent. Subsequently, S1 is carried out.

S12: A check is performed to determine whether the data frame under consideration is a non-express frame, for example by checking whether it has an EtherType supplementary entry IET_EtherType. If this is not the case, the data frame under consideration is an express frame and S13 is carried out; otherwise, the data frame under consideration is a non-express frame and S16.1 is carried out.

S13: A check is performed to determine whether a non-express frame is presently being sent. If this is not the case, S14 is carried out; otherwise, S15 is carried out.

S14: The data frame under consideration, which in this case is an express frame, is transmitted completely. Subsequently, S1 is carried out.

S15: If the as yet untransmitted number of useful data bytes of the presently sent non-express frame exceeds the minimum residual number of bytes, the transmission of the presently sent non-express frame is interrupted and a data frame fragment that includes the as yet untransmitted useful data of the non-express frame is formed and incorporated into the transmission list. Otherwise, the transmission of the presently sent non-express frame is completed. In any case, S14 is subsequently performed.

S16.X for X=1, 2, 3, 4: A check is performed to determine whether a non-express frame having the interrupt priority X is currently being sent. If this is the case, S1 is carried out; otherwise, method step S17.X is carried out in the cases X=1, 2, 3 and method step S19 is carried out in the case X=4.

S17.X for X=1, 2, 3: A check is performed to determine whether the data frame under consideration has the interrupt priority X. If this is not the case, S16.X+1 is carried out; otherwise, S18 is carried out.

S18: A check is performed to determine whether a non-express frame is currently being sent. If this is not the case, S19 is carried out; otherwise, S20 is carried out.

S19: The data frame under consideration starts to be transmitted. Subsequently, S1 is carried out.

S20: If the as yet untransmitted number of useful data bytes of the presently sent non-express frame exceeds the minimum residual number of bytes, the transmission of the presently sent non-express frame is interrupted and a data frame fragment that includes the as yet untransmitted useful data of the non-express frame is formed and incorporated into the transmission list. Otherwise, the transmission of the presently sent non-express frame is completed. In any case, S19 is subsequently performed.

Although the invention has been illustrated and described in more detail by preferred exemplary embodiments, the invention is not limited by the examples disclosed and other variations can be derived therefrom by a person skilled in the art without departing from the scope of protection of the invention.

What is claimed is:

1. A method for transmitting data in a communication network according to a communication protocol using a point-to-point connection between a transmitter and a receiver wherein the data frame has a minimum residual number of bytes, said point-to-point connection having a transmission list of data frames, said method comprising:
   transmitting data frames including metadata and useful data between the transmitter and receiver in accordance with the transmission list of data frames, said transmission list prescribing a priority for each data frame from a set of at least three different interrupt priorities, said priorities having significances differing in pairs, said communication protocol allowing each data frame on the transmission list to be allocated an interrupt priority;
   interrupting transmission of a data frame listed on the transmission list to transmit a data frame that has a higher interrupt priority on the transmission list; and
   interrupting the transmission of a data frame on the transmission list only when the number of useful data bytes as yet untransmitted exceeds the prescribed minimum residual number of bytes in the data frame.

2. The method of claim 1, wherein there is agreement between the transmitter and receiver of the point-to-point connection on how many different interrupt priorities are available for the transmission list of the point-to-point connection.

3. The method of claim 2, wherein there is agreement between the transmitter and receiver that the transmission of data frames is never interrupted when the transmitter or the receiver does not support transmission interrupts.

4. The method of claim 1, further comprising:
   splitting useful data in a data frame having an interrupt priority that is lower than the highest interrupt priority in the priority set into data frame fragments before transmitting the data frame;
   successively transmitting the data frame fragments; and
   ascertaining whether the transmission of the data frame is to be interrupted by checking whether the transmission list includes a data frame having a higher interrupt priority before sending a fragment of said split data frame.

5. The method of claim 4, wherein each data frame fragment has a frame length of at least 64 bytes.

6. The method of claim 4, wherein the metadata of each data frame fragment of a data frame includes the interrupt priority of the data frame, a frame number of the data frame, and the number of useful data bytes of the data frame not yet sent.

7. The method of claim 4, wherein a multicast address is reserved for the data frame fragments of a data frame, and included in the metadata of each data frame fragment that follows the first data frame fragment as a destination address.

8. The method of claim 4, wherein a receiver receives a data frame split into data frame fragments, further comprising the steps of:
using the metadata of the data frame fragments received by the receiver to ascertain whether all data frame fragments of the data frame have been received, by ascertaining the total number of useful data bytes in all received data frame fragments having metadata including the same frame number and comparing the total number of useful data bytes in the data frame with the total number of received useful data bytes of said data frame; and
compiling the received data frame fragments having metadata including the same frame number to form a data frame after all data frame fragments have been received.

9. The method of claim 1, wherein the metadata of each data frame having an interrupt priority that is lower than the highest interrupt priority in the priority set, includes the interrupt priority allocated to the data frame and a frame number that characterizes the data frame.

10. The method of claim 1, wherein the communication network is an Ethernet network.

11. A method for transmitting data in a communication network according to a communication protocol using a point-to-point connection between a transmitter and a receiver wherein the data frame has a minimum residual number of bytes, said point-to-point connection having a transmission list of data frames, said method comprising:
transmitting data frames including metadata and useful data between the transmitter and receiver in accordance with the transmission list of data frames, said transmission list prescribing a priority for each data frame from a set of at least three different interrupt priorities, said priorities having significances differing in pairs, said communication protocol allowing each data frame on the transmission list to be allocated an interrupt priority; and
interrupting transmission of a data frame listed on the transmission list to transmit a data frame that has a higher interrupt priority on the transmission list;
interrupting the transmission of a data frame when, during the transmission of said data frame, a data frame having a higher interrupt priority than the data frame being transmitted is incorporated into the transmission list; and
interrupting the transmission of a data frame on the transmission list only when the number of useful data bytes as yet untransmitted exceeds the prescribed minimum residual number of bytes in the data frame.

12. The method of claim 11, further comprising the step of:
incorporating a data frame fragment that includes as yet untransmitted useful data of a data frame into the transmission list in response to an interruption in the transmission of said data frame.

* * * * *